No. 704,942. Patented July 15, 1902.
C. F. SMITH.
OIL OR MOLASSES FAUCET.
(Application filed Mar. 2, 1901.)
(No Model.)
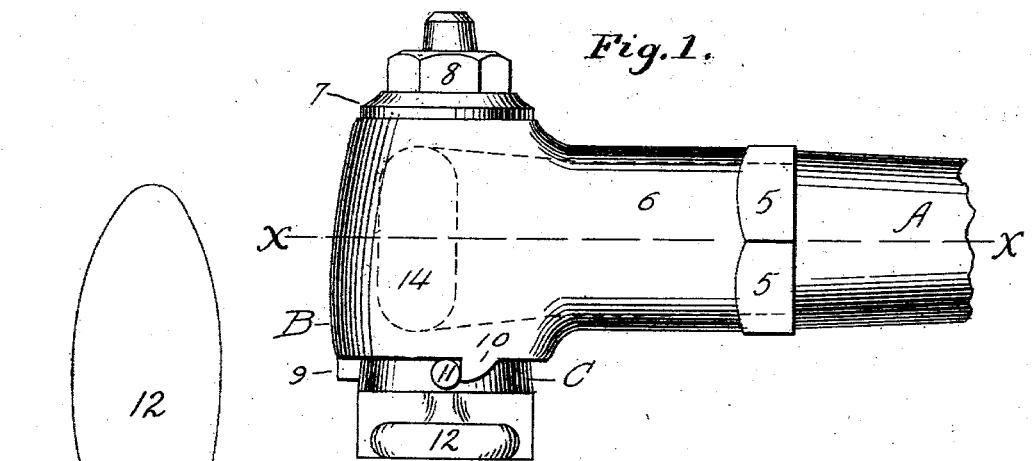
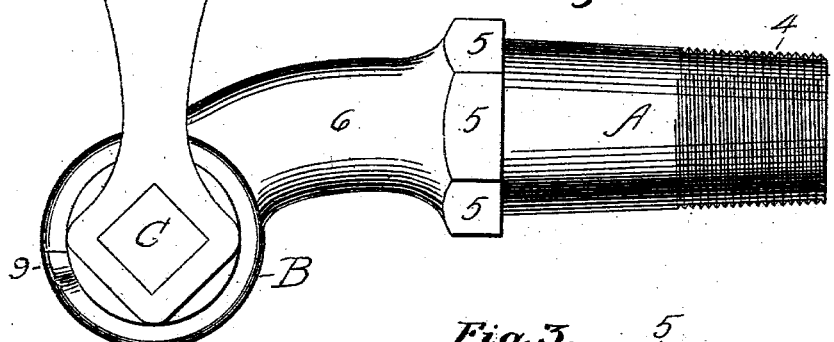
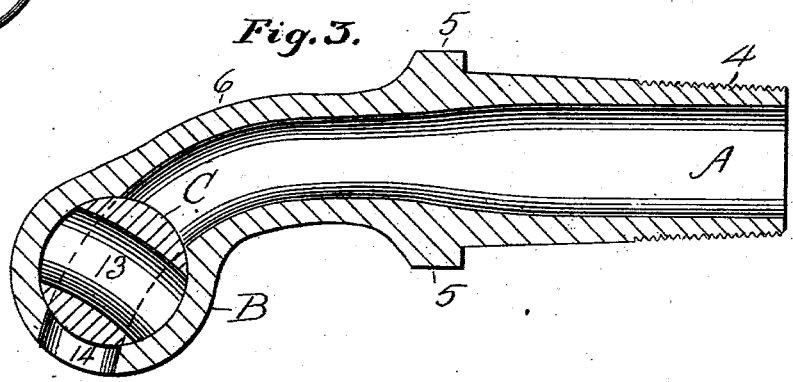
Witnesses
B. C. Woodford
P. J. Egan
Inventor
Charles F. Smith.
By James Shepard
Atty.

UNITED STATES PATENT OFFICE.

CHARLES F. SMITH, OF NEW BRITAIN, CONNECTICUT, ASSIGNOR TO LANDERS, FRARY AND CLARK, OF NEW BRITAIN, CONNECTICUT.

OIL OR MOLASSES FAUCET.

SPECIFICATION forming part of Letters Patent No. 704,942, dated July 15, 1902.

Application filed March 2, 1901. Serial No. 49,561. (No model.)

*To all whom it may concern:*

Be it known that I, CHARLES F. SMITH, a citizen of the United States, residing in New Britain, in the county of Hartford and State of Connecticut, have invented certain new and useful Improvements in Oil or Molasses Faucets, of which the following is a specification.

My invention relates to improvements in oil and molasses faucets; and the objects of my improvements are simplicity and economy in construction and general efficiency in use.

In the accompanying drawings, Figure 1 is a plan view of the main portion of my faucet. Fig. 2 is a side elevation thereof, and Fig. 3 is a vertical section thereof on the line $xx$ of Fig. 1.

A designates the usual hollow stem or shank, exteriorly threaded, as at 4, and provided with angular faces 5 for the application of a wrench for screwing the said stem into place. The neck 6, which extends outwardly from the angular faces 5, is of flattened or oval form, widened laterally and narrowed vertically, as shown by a comparison of Figs. 1 and 2. This neck also curves downwardly, as shown in Figs. 2 and 3, and merges into the barrel or head B, the curve of the neck being such that the horizontal axis of the barrel is considerably below the axis of the stem, and inasmuch as the axis of the barrel extends horizontally the periphery of the barrel on its under side is its lowermost part. The barrel is bored horizontally to receive the tapering plug C, which may be fitted to and held in said barrel in any ordinary manner. As shown, the plug C is held in place by a stop-washer 7 and nut 8. I also provide the barrel with any ordinary form of stop-shoulders 9 10 and the plug with the stop or pin 11 to limit the movement of the plug to a quarter-revolution, and I provide the said plug with any desired form of handle 12. The plug is of the usual construction, except that the passage 13 through it extends over a much greater portion of its length than does the round hole that matches the round passage through the stem and neck of ordinary faucets. I have before referred to the neck of the faucet being widened laterally and narrowed vertically, and the passage through the faucet changes in like manner from a round to an oval or flattened form. At the end of the stem A this passage is round, and as it passes by the faces 5 it changes to a flattened or oval form and gradually widens to meet the elongated mouth or opening 14 in the under side of the periphery of the barrel, as shown in Fig. 3 and as indicated by the broken lines in Fig. 1.

The faucet is represented as closed in all figures of the drawings. Pulling the handle 12 forward from the position shown one-quarter turn to a horizontal position will bring the opening 13 through the plug into line with the downwardly-curved passage through the faucet, as indicated by the broken lines in Fig. 3, whereby the discharge will be properly directed and the delivery, although from the periphery of the barrel, will be smooth and even, without any objectionable spreading or waste.

The cheapness of the construction is apparent without any explanation, and it is believed that by reason of the peculiar form shown and described a very convenient and efficient faucet is produced.

I claim as my invention—

The herein-described faucet having the hollow securing-stem A, the curved neck 6 of an oval form extending outwardly and downwardly from the said stem, a horizontally-depending head or barrel B, with a delivery-opening 14 elongated in the line of the barrel at both its influent and effluent ends, the effluent end terminating in the circular outer wall of the said barrel and an opening and closing plug C within the said barrel, substantially as described.

CHARLES F. SMITH.

Witnesses:
G. W. LANDERS,
L. H. PINKS.